United States Patent [19]

Lee

[11] Patent Number: 5,788,009
[45] Date of Patent: Aug. 4, 1998

[54] STEERING GEAR BOX HAVING A BUFFER

[75] Inventor: Dong Sub Lee, Ulsan, Rep. of Korea

[73] Assignee: Hyundai Motor Co., Rep. of Korea

[21] Appl. No.: 674,811

[22] Filed: Jul. 3, 1996

[30] Foreign Application Priority Data

Jul. 4, 1995 [KR] Rep. of Korea ............... 95-19381

[51] Int. Cl.$^6$ ................................................. B62D 5/06
[52] U.S. Cl. ................................ 180/428; 74/422; 74/526
[58] Field of Search ............................. 180/428; 280/89, 280/94; 74/526, 422, 498

[56] References Cited

U.S. PATENT DOCUMENTS 3,788,159  1/1974  Plant, II ................................. 74/422
4,709,591  12/1987  Emori et al. ........................... 74/526
4,828,068  5/1989  Wendler ................................. 180/428

Primary Examiner—Daniel G. DePumpo
Attorney, Agent, or Firm—Finnegan, Henderson, Farabow, Garrett & Dunner, L.L.P.

[57] ABSTRACT

A buffer is provided in the rack stopper of cylindrical tube of a steering gear box of an automobile. The buffer includes a housing imbedded into the rack stopper, a piston rod extending outwardly from the housing, and a spring for elastically supporting the piston rod in the housing, whereby the piston rod of the buffer bumps against a bracket of a ball joint connector when the steering wheel is turned to the left or right to the maximum position.

3 Claims, 3 Drawing Sheets

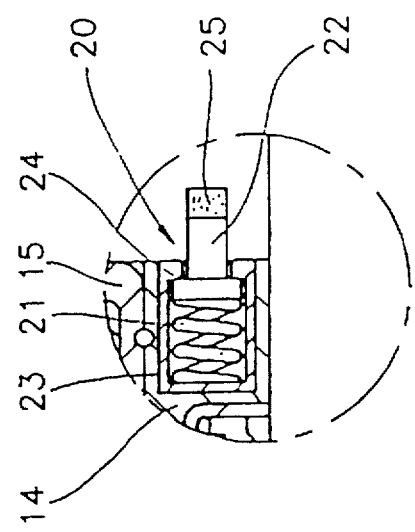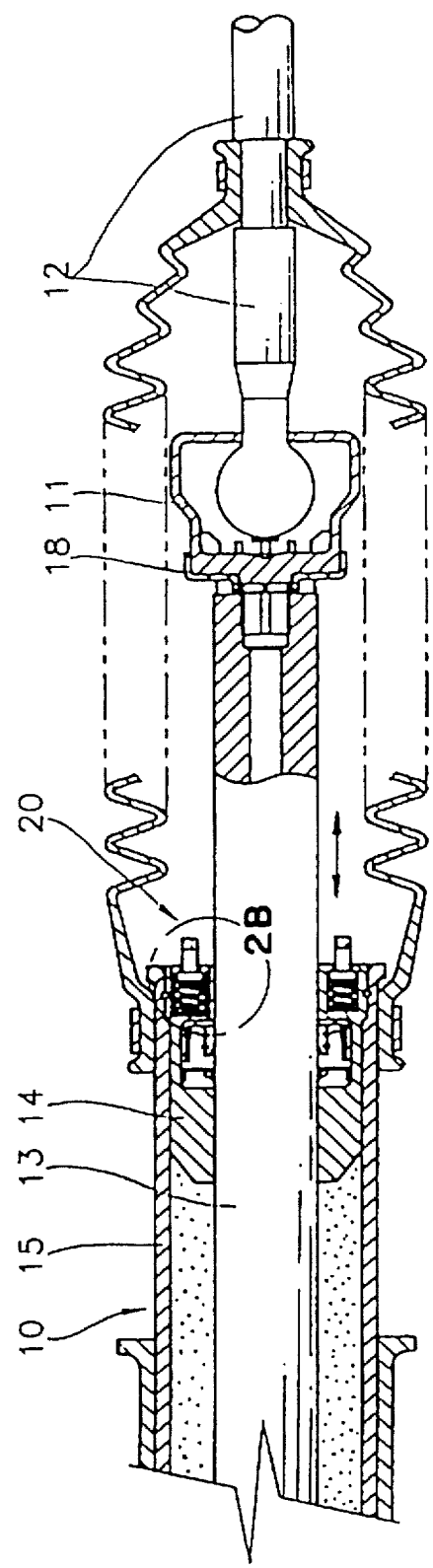

STEERING GEAR BOX HAVING A BUFFER

BACKGROUND OF THE INVENTION

1. Field of the Invention

The present invention relates to a steering gear box of an automobile and, more particularly, to a gear box having a buffer for reducing the shock or noise which occurs in the steering gearbox when the steering wheel is rotated to its maximum position.

2. Description of the Prior Art

Generally, a conventional steering gear box is provided between a steering column and a link mechanism connected in order to transfer rotation of the steering column into linear movement of the link mechanism, operated in a mechanical or hydraulic manner.

FIG. 1 represents a steering apparatus, by way of an example, in which a steering gear box 10 is constructed with hydraulics with both ends of a cylinder rod or rack therein are connected with tie rods 12. Numerals 16 and 17 denote the steering wheel and tires, respectively.

More specifically, the conventional gear box 10 is exemplified by FIG. 3, which includes a cylinder tube 15, a rack or cylinder rod 13, and a rack stopper 14. Both ends of the rack 13 are coupled by the tie rods 12 through a ball joint connectors 11. The end portions of the cylinder tube 15 and the tie rods 12 are covered by bellows.

In this arrangement, the rack stoppers 14 are mounted at both ends of the cylinder tube 15 such that they limit the distance of the lateral movement of the rack 13 as well as slidably sealing the rack 13 and preventing leakage of operating oil from the cylinder tube 15.

However, the above gear box 10 has a drawback of excessive operating noise, when the steering wheel is turned to the left or right to the maximum position. This is derived from bumping of the tap or bracket of the ball joint connector 11 against the outer surface of the rack stopper 14.

The resultant shock and noise are delivered to the automobile driver or passenger through the steering mechanism, which result in unpleasantness and discomfort.

SUMMARY OF THE INVENTION

The present invention is intended to overcome the above described problems of the conventional steering gear box.

Therefore, it is an object of the present invention to provide a steering gear box in which a buffer is mounted with the outer surface of the rack stoppers, thereby to reduce the operating noise and shock caused by bumping the ball joint connector against the buffer.

In achieving the above object, the present invention comprises a steering gear box having a cylinder tube mounting an operating rack or rod slidably therethrough, in which both ends of the operating rack are coupled to ball joint connectors holding the tie rods of steering wheels, and both ends of the cylinder tube are provided with rack stoppers for bumping against a tap of the ball joint connectors. The improvement comprises a plurality of buffers mounted at the outer surface of the rack stoppers, each buffer including a housing imbedded in the rack stopper, a piston rod extending outwardly from the housing, and a spring for elastically supporting the piston rod in the housing, whereby the ends of the piston rods are bumped against the tap of the ball joint connectors when the steering wheel is turned to the left or right to the maximum position.

In a preferred embodiment of this invention, elastomeric material is provided on the end of each piston rod.

BRIEF DESCRIPTION OF THE DRAWINGS

The above object and other advantages of the present invention will become more apparent by describing in detail the preferred embodiment of the present invention with reference to the attached drawings in which:

FIG. 2 is a partial sectional view of a steering gear box configured in accordance with the present invention.

DETAILED DESCRIPTION OF THE PREFERRED EMBODIMENT

Referring to FIG. 2, there is shown a steering gear box of the present invention.

Figure 1:
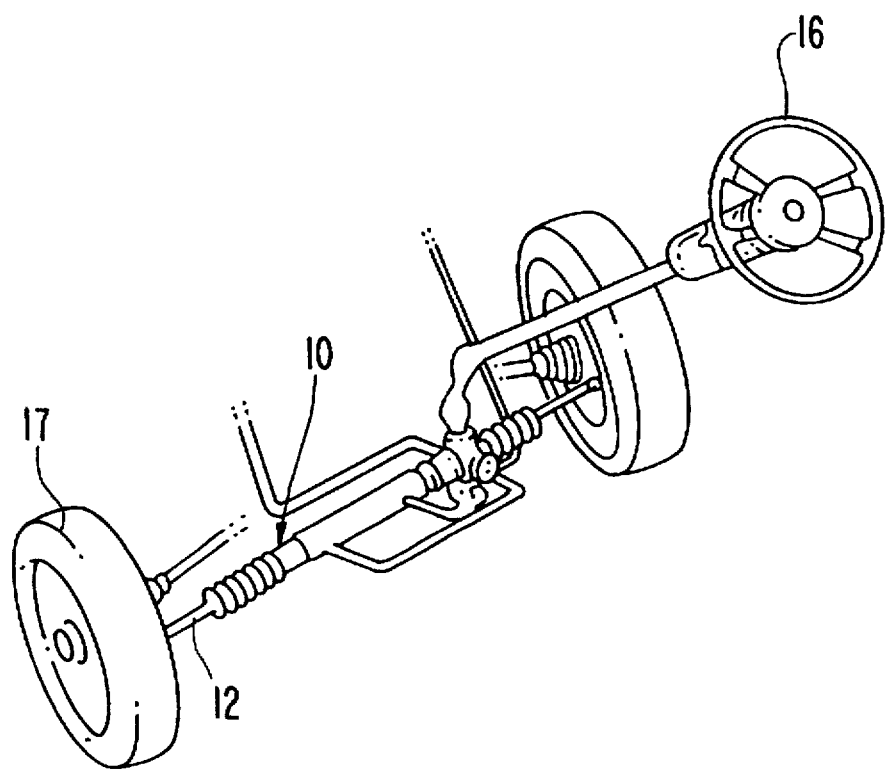
FIG. 1 is a schematic illustration of a typical steering apparatus of an automobile.
Figure 3:
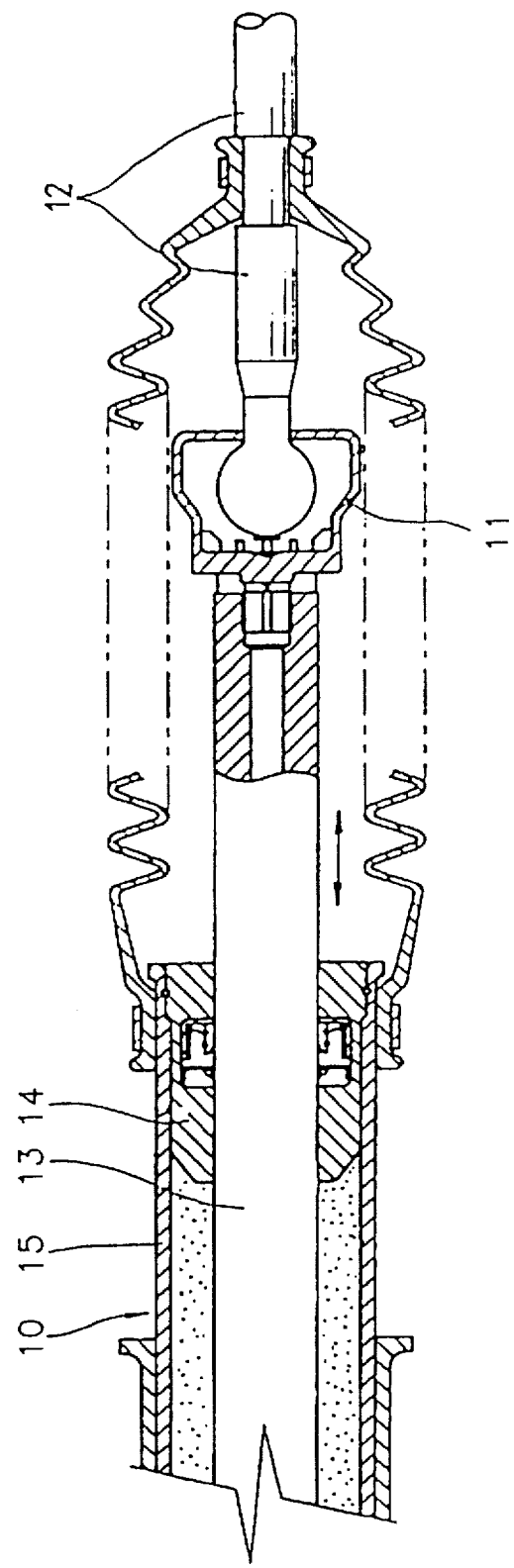
FIG. 3 is similar view as FIG. 2, showing a conventional steering gear box.

As similar with the gear box shown in FIG. 3, the steering gear box 10 comprises a cylinder tube 15, mounting an operating rack or rod 13 slidably therethrough. Both ends of the cylinder tube 15 are provided with rack stoppers 14, and both ends of the operating rack 13 are coupled to ball joint connectors 11 which hold the tie rods 12 of the steering wheel (not shown). A buffer 20 is mounted at the outer surface of the rack stoppers 14 in accordance with the present invention.

As shown in detail in the enlarged circle portion of FIG. 2, the buffer 20 comprises a cylindrical housing 23 which is imbedded in the rack stoppers 14, a piston rod 22 extending outwardly from the housing 23, and a spring 21 for elastically supporting the piston and rod 22 in the housing 23.

Preferably, at least four of the above buffers 20 are imbedded along the periphery of the rack stoppers 14 at the same interval, around the rack 13.

Thus, a plurality of buffers 20 are mounted at the face of the rack stoppers 14 to be bumped against a tap 18 of the ball joint connectors 11.

Eventually, a plurality of the ends of piston rods 22 are bumped against the tap 18 of the ball joint connectors 11 when the steering wheel is turned to the left or right to the maximum position.

In this embodiment, each end of the piston rods 22 is provided with an elastomeric material, for example, a rubber of short tubular form having the same diameter as the piston rod 22 to which it is attached.

The operation and effect of the buffer of the present invention will be apparent from the following description.

When the steering wheel is turned to the left to the maximum steering position, the operating rack 13 of the cylinder 15 moves leftwardly, with reference to the drawing FIG. 2, pulling the tie rod 12 via the ball joint connector 11, until the tap 18 of the ball joint connector 11 bumps against the outer surface of the rack stopper 14.

In this instance, a plurality of the piston rods 22 directly abut against the tap 18 of the ball joint connector, and the shock or noise are absorbed by the compressing of the springs 21.

Further, the rubber 25 attached to the end of each piston rod 22 doubles the buffering operation.

As will be apparent from the foregoing description, the buffer 20 of the present invention can considerably reduce the shock or noise occurring at the rack stoppers and the ball joint connectors in the maximum steering operation, allowing automobile drivers and passengers to be in a more comfortable environment.

What is claimed is:

1. In a steering gear box having a cylinder tube mounting an operating rack slidably therethrough, in which each end of the operating rack is coupled to a ball joint connector holding a tie rod, and each end of the cylinder tube is provided with a rack stopper for bumping against a tap of the respective ball joint connector, wherein the improvement comprises: a buffer mounted at an outer surface of each rack stopper, each buffer including a housing imbedded into the rack stopper, a piston rod extending outwardly from the housing, and a spring for elastically supporting the piston rod in the housing, whereby an end of the piston rod is configured to bump against the tap of the respective ball joint connector when a steering wheel is turned to the left or right to a maximum position.

2. The steering box of claim 1, wherein the end of each piston rod is provided with an elastomeric material.

3. A steering gear box comprising:

a cylinder tube mounting an operating rack slidably therethrough;

a pair of ball joint connectors, one connector coupled to each end of the operating rack;

a pair of tie rods, one tie rod connected to each ball joint connector;

a pair of rack stoppers, one rack stopper connected at each end of the cylinder tube, for bumping against a tap of the respective ball joint connector; and a buffer mounted at an outer surface of each rack stopper, each buffer including a housing embedded into the rack stopper, a piston rod extending outwardly from the housing, and a spring for elastically supporting the piston rod in the housing, whereby an end of the piston rod is configured to bump against the tap of the respective ball joint connector when a steering wheel is turned to a maximum left or right position.

* * * * *